United States Patent [19]

Funatsu

[11] Patent Number: 4,978,945

[45] Date of Patent: Dec. 18, 1990

[54] ALARM SUPPRESSING SYSTEM IN AIRCRAFT COLLISION AVOIDANCE SYSTEM

[75] Inventor: Chuhei Funatsu, Kanagawa, Japan

[73] Assignee: Toyo Communication Equipment Co., Japan

[21] Appl. No.: 373,205

[22] Filed: Jun. 30, 1989

Related U.S. Application Data

[63] Continuation-in-part of Ser. No. 65,217, Jun. 5, 1987, abandoned.

[51] Int. Cl.$^5$ .................................................. G01S 9/56
[52] U.S. Cl. ....................................... 340/961; 342/29; 342/455; 364/461
[58] Field of Search .............. 340/961, 963; 364/461, 364/439; 342/29, 30, 32, 36–38, 455

[56] References Cited

U.S. PATENT DOCUMENTS

| | | | |
|---|---|---|---|
| 3,626,411 | 12/1971 | Litchford | 342/32 |
| 3,750,168 | 7/1973 | Schrader et al. | 342/455 |
| 3,947,845 | 3/1976 | Lyon | 342/455 |
| 4,027,307 | 5/1977 | Litchford | 342/455 |
| 4,197,538 | 4/1980 | Stocker | 342/32 |

FOREIGN PATENT DOCUMENTS

| | | | |
|---|---|---|---|
| 0073477 | 4/1985 | Japan | 342/29 |
| 87/04255 | 7/1987 | PCT Int'l Appl. | 342/36 |

OTHER PUBLICATIONS

"Handbook for Electronics and Communication Engineers" published on Mar. 30, 1979 by The Institute of Electronics and Communication Engineers of Japan; including English language translation.

*Primary Examiner*—Joseph A. Orsino
*Assistant Examiner*—Brent A. Swarthout

[57] ABSTRACT

The present invention is concerned with a system in which when the altitude of a subject aircraft becomes lower than a predetermined altitude, a warning limit value is reduced or made equal to zero on the minimum altitude side whereby a useless alarm based on response signals delivered from other aircraft staying in or taxiing in the airport are suppressed.

5 Claims, 4 Drawing Sheets

4,978,945

ALARM SUPPRESSING SYSTEM IN AIRCRAFT COLLISION AVOIDANCE SYSTEM

CROSS-REFERENCE TO RELATED APPLICATIONS

This application is a continuation-in-part of now abandoned application Ser. No. 07/065,217, filed in the U.S. Patent and Trademark Office on June 5, 1987.

FIELD OF THE INVENTION

This invention relates to a collision avoidance system for aircraft, and more particularly to an alarm suppressing system in an aircraft collision avoidance system wherein useless alarms which are given by the aircraft collision avoidance system with respect to other approaching aircraft are suppressed, whereby useless warning and operations by pilots are reduced as much as possible.

DESCRIPTION OF THE PRIOR ART

For avoiding aircraft collision, various systems have been heretofore proposed. In general, any of these systems measures a distance between a subject and other aircraft, and optionally measures an altitude difference and/or closing rate by a suitable method, and when these values are within a given limit value, pilots are warned that there is a dangerous situation.

More specifically, large and medium-sized aircraft are provided with aircraft collision avoidance systems which determine the positions of other aircraft approaching the subject aircraft and give an alarm; each aircraft collision avoidance system is equipped with an interrogator for interrogating other aircraft and an ATC transponder for responding to interrogation signals from other aircraft. On the other hand, small-sized aircraft such as private airplanes are only equipped with an ATC transponder in view of installation space and cost for the system.

In order to assist understanding of the present invention, the functions of an ATC transponder will be simply described herein.

Such an ATC transponder may be classified into three categories at present on the basis of the functions retained therein. The simplest type of ATC transponder is a so-called mode A transponder whose response signal contains only identifying information of the specified aircraft and which merely responds to an interrogation signal delivered from an interrogator. A device is added to the aircraft collision avoidance system by which a response signal was received, for example, which decides a relative distance by means of its received electric field intensity or a period of time necessary for interrogation or response and at the same time, detects the arrival bearing of the response signal, so that such system can also specify the bearing of the interrogator.

There is somewhat higher-grade transponder, a so-called mode C transponder which includes altitude information in its response signal and in this case, the atmospheric pressure of flight altitude of the aircraft equipped with the transponder is employed as the altitude information.

Moreover, a transponder, so-called mode S transponder contains an identification code inherent to the aircraft in its response signal.

In an aircraft and its borders where aircraft converge thereinto and where accidents may also occur frequently, it is an empirically well known fact that such aircraft which respond to an interrogation signal delivered from the interrogator of an aircraft collision avoidance system are not necessarily other flying aircraft, but include ATC transponders mounted on aircraft or waiting for departure in the airport which also respond to interrogation signals. In this respect, alarms are frequently given based on response signals from the ATC transponders mounted on these aircraft which involve no danger of collision in the sky in a conventional aircraft collision avoidance system. Thus, there is a disadvantage in that a pilot is not only troubled at the time when his attention must be concentrated on controlling the aircraft, i.e., before and after taking off and landing, but also his attention is diverted by such useless frequent alarms so that it may result in a very dangerous situation.

An example of conventional aircraft collision avoidance systems will simply be described hereinbelow in order to simplify the understanding of the present invention.

FIG. 1 is an explanatory view chowing a passive type aircraft collision avoidance system in which an ATC transponder is used wherein reference numeral 1 designates a ground secondary surveillance radar which emits an interrogation signal delivered from an interrogation station 2 through an antenna 3; the interrogation signal is received and responded to by ATC transponders 7 and 8 mounted on a subject aircraft 5 and another aircraft 6 flying through a radiation pattern 4 for said interrogation signal.

In such a system, it is found that the other aircraft, as shown in FIG. 2(a), is located anywhere on the circumference of a spheroid 9 having focuses located on the ground secondary surveillance radar 1 and on the subject aircraft 5 as determined by both interrogation signal reception time T1 of the ground secondary surveillance radar 1 in the subject aircraft 5 and reception time T2+T3 of a response signal responded to by the other aircraft to the interrogation signal of the ground secondary surveillance radar 1 (according to the property of an ellipse, distances added length between a point of the circumference of an ellipse and each of its focuses are the same even if the point of the circumference of an ellipse is anywhere. Namely, it means "T2+T3=T'2+T'3"). Furthermore, since the response signal transmission intensity of the ATC transponder has previously been provided for by law, it is found that the other aircraft exists on a sphere 10 centering around the subject aircraft 5 from response signal level derived from the other aircraft. Accordingly, it is possible to specify positions of the other aircraft on points of intersections A or B between the spheroid 9 and the sphere 10, and it is also possible to know mutual distances of the subject and other sircraft.

However, the relative altitude of the subject to the other aircraft is not yet clear from only the conditions as described above. In this respect, since there is also an ATC transponder whose response signal contains altitude information as mentioned above, such a response signal is decoded to obtain the altitude information, and an altitude based on altimeter of the subject aircraft is compared with the altitude information so as to thereby specify the relative altitude of the subject to the other aircraft.

Even in such a case, as shown FIG. 2(b), where distance H of horizontal direction between aircraft each equipped with the collision avoidance system as mentioned above is small, when there is a sufficient altitude difference A, there exists little danger of an aircraft collision. Hence, there has been proposed such a system wherein the distance between aircraft as well as the altitude difference between the subject aircraft and the other aircraft is detected by including altitude information in the ATC transponder response signal, so that an alarm is given in the case where both the detected distances exceed a prescribed threshold.

In such a system, however, since the threshold is generally fixed, there has been, as mentioned above, a defect in that when an aircraft lowers its altitude to hold a landing position in the vicinity of an airport, a collision avoidance alarm will be output due to an interrogation response signal from either an ATC transponder mounted on an aircraft staying in the airport, or an ATC transponder mounted on an aircraft waiting for departure in spite of the fact that there is no danger of collision, so that a pilot is confused and his attention is diverted.

As mentioned above, however, since the S mode of the ATC transponder contains "ON THE GROUND" information, there is no problem if the subject aircraft effects suitable processing on the basis of this information.

Such problem still remains in mode A and C transponder response signals which do not contain "ON THE GROUND" information.

The present invention has been made to eliminate disadvantage involved in such conventional aircraft collision avoidance systems as mentioned above. An object of the present invention is to provide an alarm suppressing system in aircraft collision avoidance system wherein when the altitude of a subject aircraft becomes lower than a prescribed level, a warning limit value is reduced or made equal to zero on its minimum altitude side, whereby ATC transponder responses signal of an aircraft staying in an airport is discriminated from that of a flying aircraft so as to suppress useless alarms.

SUMMARY OF THE INVENTION

Namely, the present invention is concerned with a system in which when the altitude of a subject aircraft becomes lower than a predetermined altitude, a warning limit value is reduced or made equal to zero on the minimum altitude side whereby a useless alarm based on response signals delivered from other aircraft staying in or taxiing in the airport are suppressed.

Furthermore the invention is concerned with a system wherein the atmospheric pressure at the airport in the vicinity of a subject aircraft is estimated on the basis of the altitude information of the subject aircraft and atmospheric pressure information at the altitude, and a useless alarm derived from such altitude information delivered from other aircraft staying in or taxing in the airport is suppressed on the basis of an estimated value of the atmospheric pressure and an altitude value obtained from atmospheric pressure (information) contained in the response signal from the other aircraft responding to an interrogation signal delivered from the collision avoidance system of the subject aircraft.

Moreover the invention is concerned with a system wherein useless alarm derived from such altitude information delivered from other aircraft staying in or taxiing in an airport is suppressed on the basis of the atmospheric pressure information in the vicinity of the airport obtained by a subject aircraft from its airport control center and an altitude value obtained from atmospheric pressure information contained in the response signal from the other aircraft responding to an interrogation signal delivered from the collision avoidance system of the subject aircraft.

In accordance with the above described systems of this invention, pilots are not disturbed by useless alarms resulting from a response signal delivered from other aircraft with respect to which a subject aircraft has actually no fear of colliding therewith, because these other aircraft exist at a lower altitude than that of the subject aircraft in the case of its taking off and landing. Thus, the pilots can concentrate their attention on the most difficult taking off and landing operations, whereby safety in airline service is significantly improved.

DETAILED DESCRIPTION

The present invention will be described in more detail hereinbelow by referring to the accompanying drawings.

Figure 1:
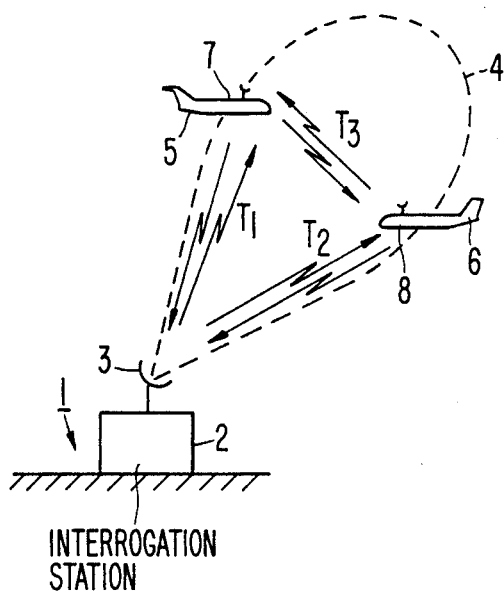
FIG. 1 is an explanatory view showing a construction of a conventional passive type aircraft collision avoidance system.
Figure 2A:
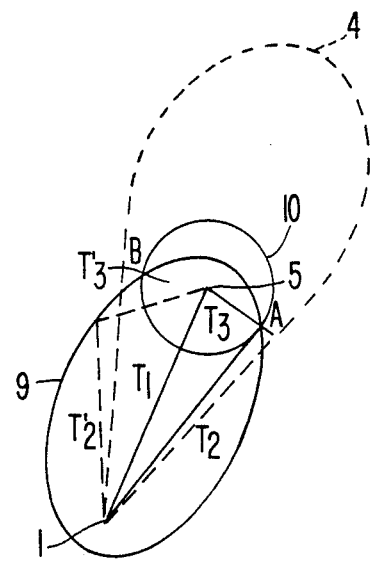
FIG. 2(a) is an explanatory view illustrating a method for measuring a distance in FIG. 1.
Figure 3:
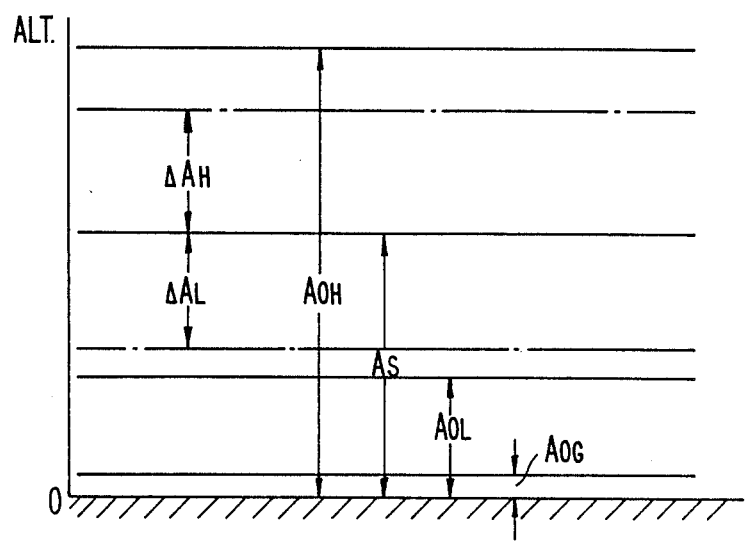
FIG. 3 is an explanatory view illustrating concept of a first embodiment of alarm suppressing system with respect to the ATC transponder response signal mode C in the aircraft collision avoidance system according to the present invention.

FIG. 3 shows one of the aircraft collision avoidance systems according to this invention in the case whose ATC transponder response signal is in mode C wherein other aircraft designate AOH and AOL with respect to a subject aircraft AS, thresholds such as warning limit altitude difference AH and AL are provided on both the upper and lower sides of the altitude AS of the subject aircraft, and the thresholds AH and AL are fixed when the altitude of the subject aircraft is at least at a prescribed altitude. In this case, when AOH-AS AH or AS-AOL AL and the distance between the subject aircraft and the other aircraft is within a given value, then an alarm is given from the system.

On one hand, when the threshold AL on the low altitude side is reduced to, for example, a value AS-AOG (70-170 feet) obtained by subtracting a height AOG of other aircraft on the ground (around 30 feet)

from the altitude As of the subject aircraft in the case when the subject aircraft's altitude AS becomes a prescribed value, e.g., an altitude 100 through 200 feed which is directed with respect to a runway at the time of landing, the pilot is not disturbed by an alarm based on the ATC transponder response signal delivered by the other aircraft staying in the very airport until just before landing the subject aircraft.

Figure 4A:
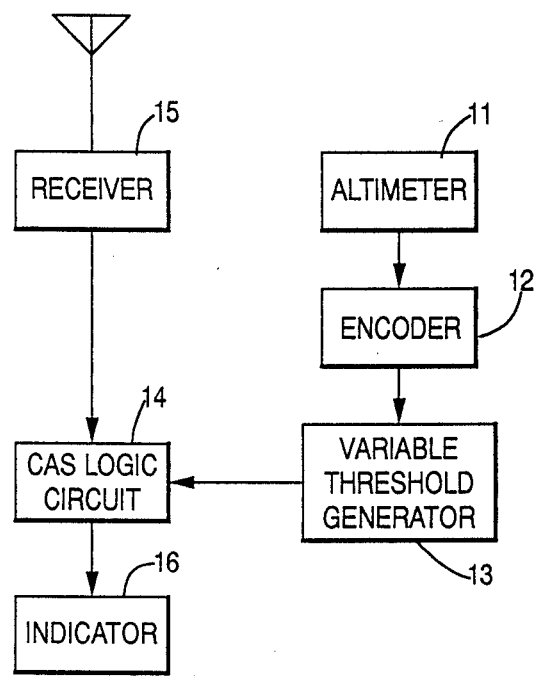
FIG. 4(a) is a block explanatory diagram showing an example for realizing the system.

FIG. 4(a) illustrates an arrangement for implementing the system, which is adapted for operation regardless of the mode of the response signal received from other aircraft.

The output from an altimeter 11 of the subject aircraft is applied to a suitable ENCODER 12, the output of which is used to control a variable threshold generator 13 on the low altitude side to change the warning limit value AL on the low altitude side in a CAS logic circuit 14. The variable threshold generator 13 may be controlled to vary or reduce its threshold value continuously or on a stepwise basis, and in this case, the circuit 13 may also be controlled manually by the pilot.

With the above arrangement, the warning limit value AL is decreased as the subject aircraft descends to a predetermined altitude of, say, 100 to 200 feet to take up position for landing, and consequently, there is no possibility of the pilot being disturbed by useless alarms resulting from ATC transponder response signals from other aircraft staying in the airport.

To simplify the system arrangement, it is possible to employ a binary control method by which the threshold value of the variable threshold generator 13 is reduced down to zero at once when the subject aircraft descends to a predetermined altitude to prepare for landing.

Figure 4B:
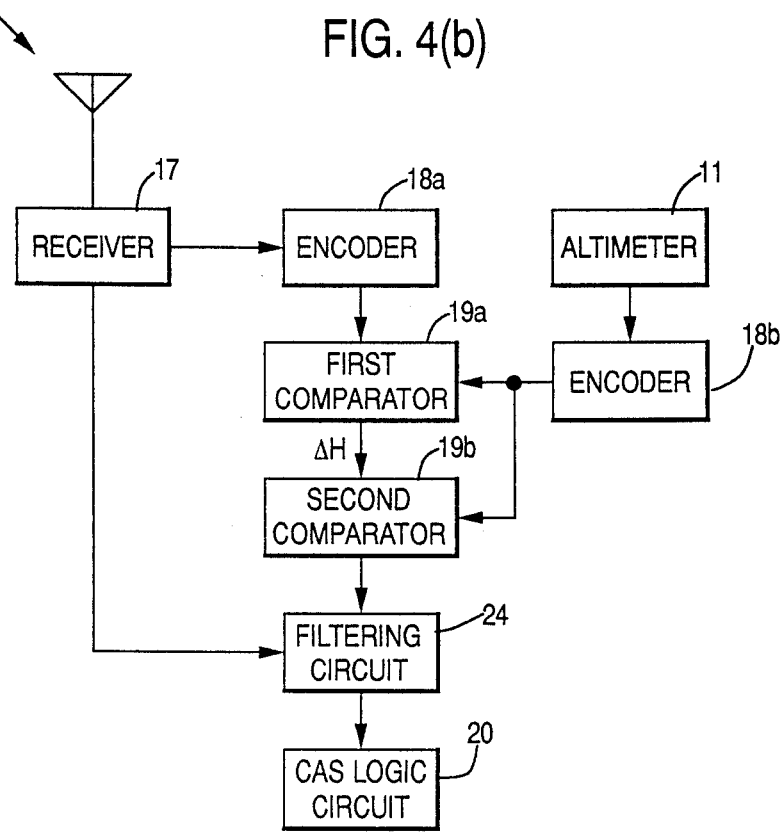
FIG. 4(b) is a block explanatory diagram showing an example for realizing the system shown in FIG. 3.

FIG. 4(b) illustrates another arrangement for implementing the system shown in FIG. 3, in which the response signal from other aircraft is the mode C signal.

An ATC transponder response signal from other aircraft, which contains its altitude information, is received by a receiver 17 of the collision avoidance equipment mounted on the subject aircraft, the altitude information is extracted by a suitable means from the received signal and converted by an encoder 18a into a required code, which is input into a comparator 19a.

On the other hand, the output from the altimeter 11 of the subject aircraft is also converted by a suitable encoder 18b into a required code, which is provided to the comparator 19a for comparison with the above-mentioned code input thereinto. An altitude difference ΔH between the subject and other aircraft is computed and this computed output is applied to a second comparator 19b, which is being supplied with the altitude information of the subject aircraft from the altimeter 11. The second comparator 19b compares the altitude difference ΔH and the altitude of the subject aircraft. When they are substantially equal, it is determined that the other aircraft is staying on the ground, and a filtering circuit 21 is controlled to inhibit the application of the received signal from the receiver 17 to a CAS logic circuit 20.

Thus, those of the response signals received by the subject aircraft which are delivered from other, aircraft staying on the ground are not applied to the CAS logic circuit 20. This ensures preventing the generation of useless alarms which distract the attention of the pilot of the subject aircraft in position for landing.

While the above embodiments have been described to employ two comparators, it is also possible to use only one comparator which is equipped with the required functions mentioned above.

Figure 5:
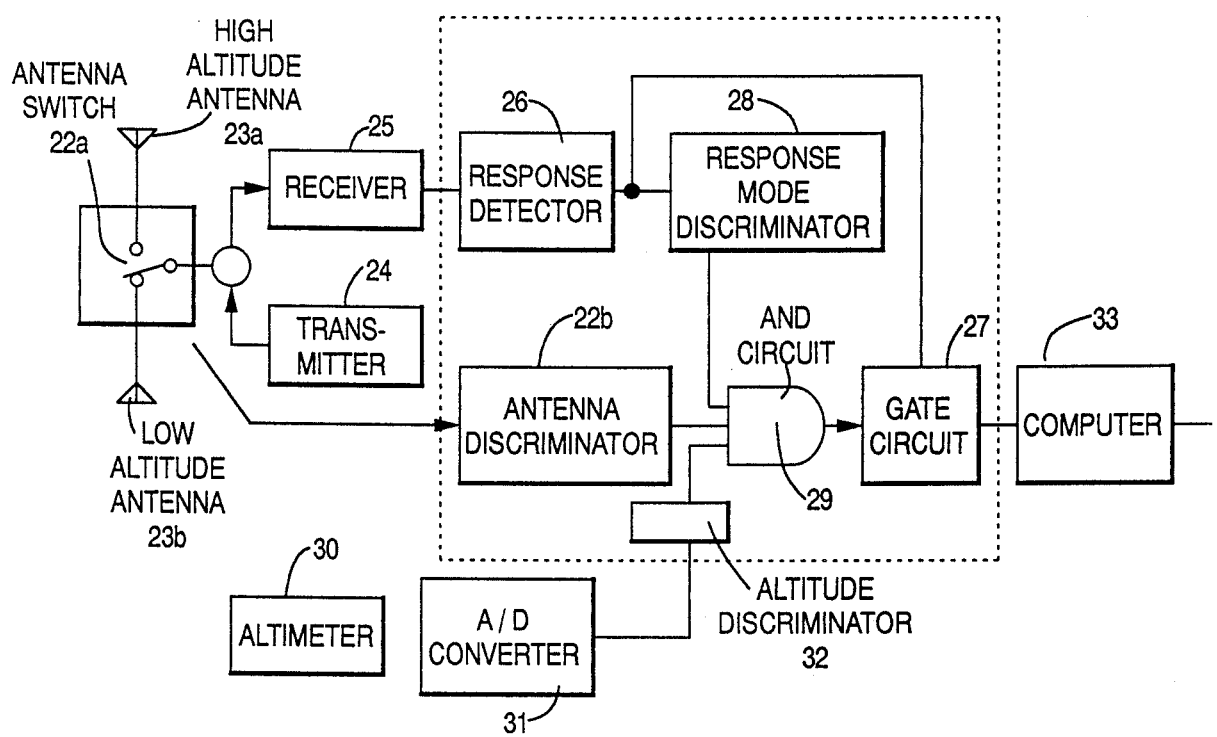
FIG. 5 is a block explanatory diagram for realizing a system which conducts processing with respect to ATC transponder response signal mode A.

FIG. 5 illustrates and example of a system which suppresses a response signal of mode A which does not include altitude information in its signal according to the present invention. An antenna alteration switch 22a electrically switches to an antenna 23a or to an antenna 23b continuously. For example, when a low altitude antenna 23b is connected, an interrogation signal from a transmitter 24 through the low altitude antenna 23b is outputted to an ATC transponder mounted on other aircraft existing in an airport and its borders by the antenna 23b. The transponder mounted on other aircraft which received the interrogation signal output response signals, and the response signals are received again by a receiver 25 through the low altitude antenna 23b. The output from the receiver 25 is fed to a gate circuit 27 and a response mode discriminator 28 through a response detector 26. The response mode discriminator 28 outputs a digital signal "1" to an AND circuit 29 when the received response signal is in mode A of the ATC transponder, and the response mode descriminator 28 outputs a digital signal "0" to the AND circuit 29 when the received response signal is in mode C or S of the ATC transponder. Furthermore, when the antenna alteration switch 22a is connected to high altitude antenna 23a, an antenna discriminator 22b outputs a digital signal "0" to the AND circuit 29, and the antenna discriminator 22b outputs a "1" to the AND circuit 29 when the switch 22a is connected to the low altitude antenna 23b.

Moreover, altitude information from an altimeter 30 is converted from analog signal into digital signal by an A/D converter 31, and the digital altitude information from the A/D converter 31 is inputted to an altitude discriminating circuit 32. The altitude discriminating circuit 32 outputs a "1" to the AND circuit 29 when the altitude of a subject aircraft is, for example, 1000 feet or less, and outputs a "0" to the AND circuit 29 when the altitude of the subject aircraft is more than 1000 feet.

Furthermore, the gate circuit 27 is blocked when a "1" is output from the AND circuit 29, and the gate circuit 27 is in a transmittal state when a "0" is output by the AND circuit 29. Namely, when a "1" is output from the AND circuit 29, output of the response detector 26 is blocked by the gate circuit 27 and is not inputted into a computer 33. On the other hand, when a "0" is output from the AND circuit 29, the output of the response detector 26 is transmitted through the gate circuit 27 and input into the computer 33.

Figure 6:
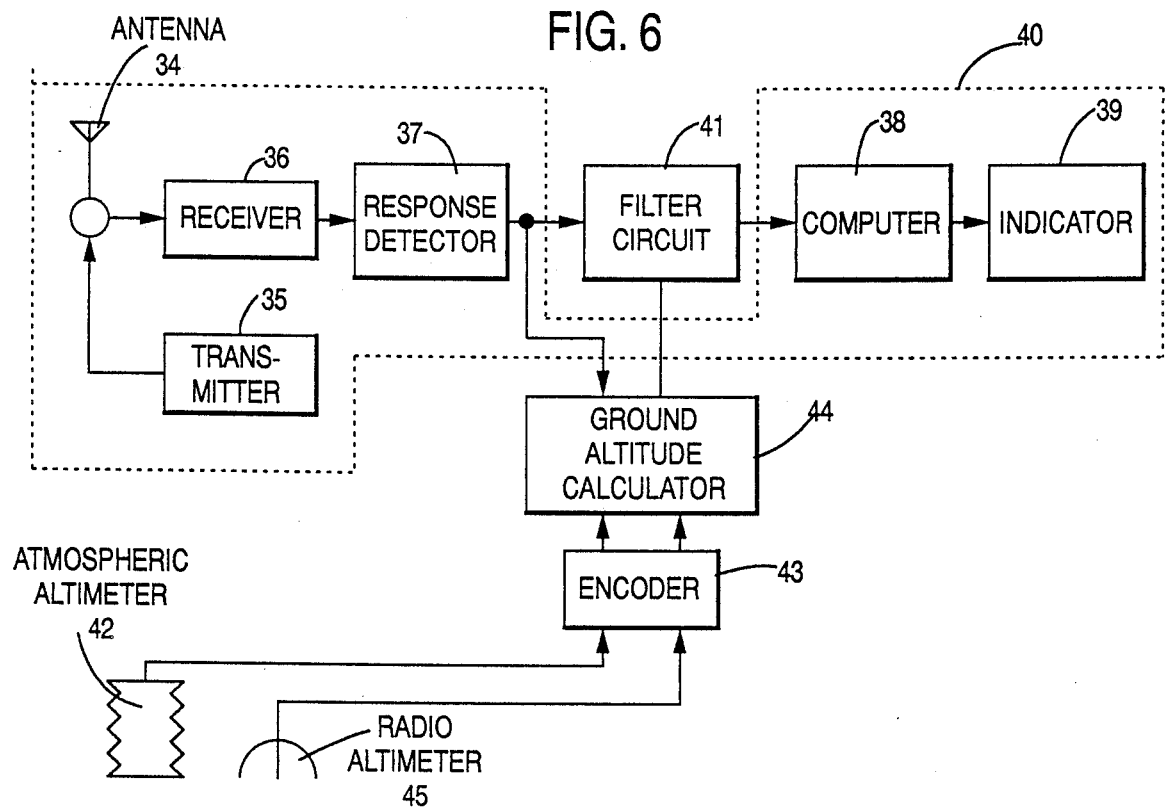
FIG. 6 is a block explanatory diagram illustrating a second embodiment of alarm suppressing system with respect to the ATC transponder response signal mode C in the aircraft collision avoidance system according to the present invention.

FIG. 6 illustrates the second embodiment in which ATC transponder response signal is in mode C among the alarm suppressing systems in aircraft collision avoidance system according to the present invention wherein a block 40 encircled with a dot and chain line is a typical aircraft collision avoidance system wherein an interrogation signal is transmitted from a transmitter 35 through an antenna 34 and is received again by the antenna 34 after having been transformed as a response signal of the ATC transponder mounted on another aircraft existing in an airport and its borders; the contents of the response signal are analyzed in a computer 38 after passing through a receiver 36 and a response detector to 37 and filter circuit 41, and if necessary the analyzed result is indicated on an indicator 39.

In the present invention, the filtering circuit 41 for determining whether or not other aircraft are on the ground is placed between the response detector 37 and computer 38. Furthermore, the system of the second embodiment is constructed such that absolute altitude information derived from an atmospheric altimeter 42 mounted on the subject aircraft is encoded by an encoder 43; the encoded information is inputted to a ground altitude calculating machine 44 to estimate a surface atmospheric pressure in an airport and its borders.

This estimation can be achieved through utilization of the following formula heretofore employed:

$$h = 18400(1 + 0.00366 \times t)\log(PO/P)$$

where h is altitude (m), t temperature (°C.), PO the atmospheric pressure on the ground (mb), and P the atmospheric pressure at the altitude h (m). For example, in the case where the mean temperature in the atmosphere is 10° C., the absolute altitude of 1000 m is 910 mb, the atmospheric pressure PO on the ground can be computed as follows:

$$1000 = 18400(1 + 0.00366 \times 10)\log(PO/910)$$

$$PO = 910 \times 1.128 = 1026.5 \text{ mb}$$

The atmospheric pressure thus obtained is compared with altitude information derived from atmospheric pressure information contained in the mode C response signal available from the response detector 37. Then it is determined, on the basis of the result of comparision, whether or not the ATC transponder response signal received is delivered from the aircraft on the ground, while taking a certain possible error into consideration, so that if the response signal is one delivered from the aircraft on the ground, a signal for inhibiting the operation of the filtering circuit 41 is supplied thereto, reference numeral 45 designates a radio altimeter.

Figure 7:
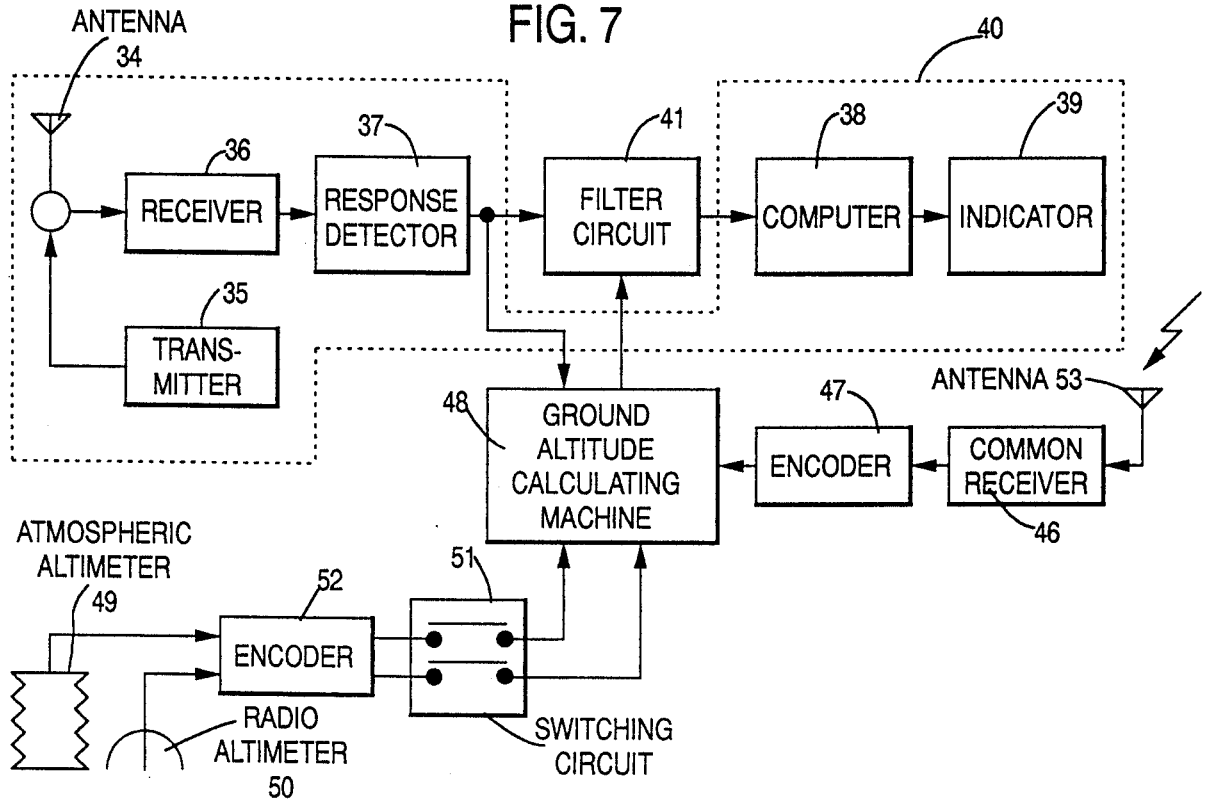
FIG. 7 is a block diagram showing a modification of FIG. 6.

FIG. 7 illustrates a modified form of the embodiment shown in FIG. 6. The parts corresponding to those in FIG. 6 are identified by the same reference numerals. In general, an airport control center always provides information concerning the surface atmospheric pressure at the safety of its landing. This embodiment is designed to utilize such atmospheric pressure information available from the airport control center, instead of obtaining the ground atmospheric pressure from the altitude information and the atmospheric pressure information of the subject aircraft as described above in connection with FIG. 6. In this embodiment, the ground atmospheric pressure information received through a common receiver 46 is encoded by an encoder 47 and the encoded information is inputted manually into a ground altitude calculating machine 48. The input information and altitude information contained in the ATC transponder response signal received from other aircraft are compared with each other through utilization of the aforementioned altitude measuring formula and so forth. In this instance, information available from a pressure altimeter 49 and a radio altimeter 50 of the subject aircraft are prevented by a switching circuit 51 from being input into the ground altitude calculating machine 48.

Figure 8:
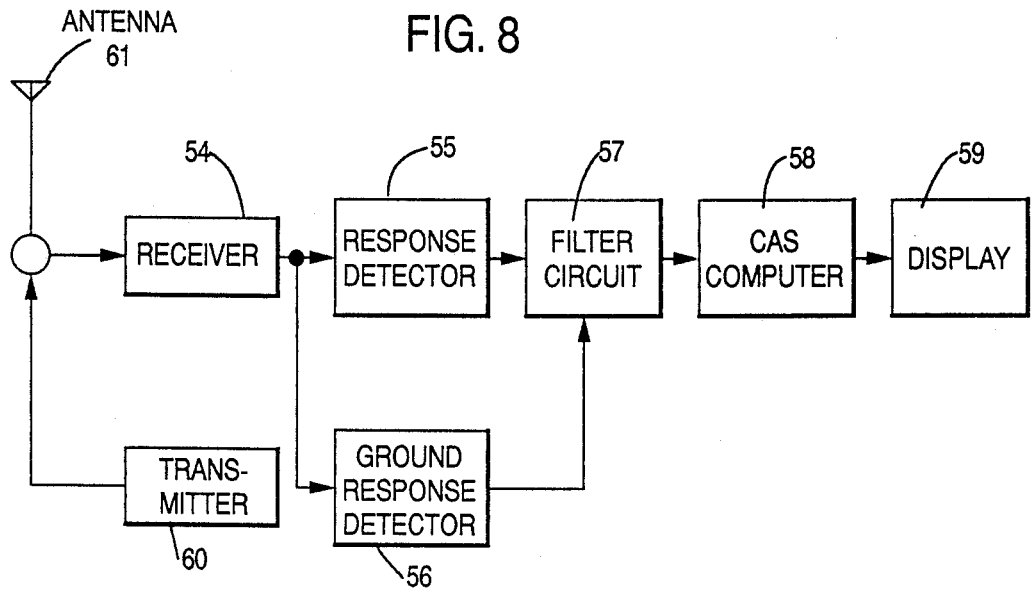
FIG. 8 is a block explanatory diagram for realizing a system which conducts processing with respect to ATC transponder response signal mode S.

FIG. 8 illustrates in block form an arrangement for processing the ATC transponder response signal of mode S. The mode S transponder response signal contains a ground signal indicating that the aircraft transmitting the response signal stays on the ground. The output of a receiver 54 is applied to a response signal detector 55 and a ground response detector 56. Where the above-mentioned ground signal is contained in the received signal, a filtering circuit 57 is controlled to inhibit the application of the output from the response detector 55. Where no ground signal is contained, the received response signal is provided to a CAS computer 58, wherein it is determined whether or not the subject aircraft is in danger of colliding with other aircraft.

Thus this embodiment prevents, for the mode S transponder response signal, the generation of useless alarms without the necessity of comparing the altitudes of the subject and other aircraft. Reference numeral 69 indicates a display, 60 a TRANSMITTER, and 61 an antenna.

As described above, the alarm suppressing system in an aircraft collision avoidance system according to the present invention can remarkably decrease the possibility of a pilots' mental concentration being disturbed by useless alarms from the aircraft collision avoidance system in, or course, such an area where most of the aircraft are provided with mode C ATC transponders as in Japan and Europe, and even in areas where there are also aircraft equipped with modes C and A ATC transponders and in addition, a proportion of small-sized airplanes equipped only with a mode A ATC transponder as in the U.S.A. Accordingly, the alarm suppressing system in accordance with the present invention is useful for safe airline service, and is particularly suitable for maintenance of safety at the time of taking off and landing of aircraft.

What is claimed is:

1. An alarm suppressing system for an aircraft collision avoidance system which has a function of determining whether or not a subject aircraft is in danger of colliding with other aircraft and which generates an alarm when it has determined that the subject aircraft is in danger of colliding with another aircraft, through utilization of a response signal received from said other aircraft, said alarm suppressing system comprising a filtering circuit and said collision avoidance system comprising:

a receiver for receiving at least said response signal from said other aircraft;
   a first encoder for encoding said received response signal into a required signal;
   an altitude information detector for detecting altitude information of said subject aircraft;
   a second encoder for encoding the output signal of said altitude information detector into a required signal;
   a first comparator for comparing the outputs of said first and second encoders;
   a collision avoidance system logic circuit which receives the output of said receiver via filtering circuit of said alarm suppressing system and determines whether or not said subject aircraft is in danger of midair collision with said other aircraft in accordance with said output of said receiver.

said alarm suppressing system comprising:
   a second comparator for comparing the output of said first comparator and the output of said second encoder;
   said filtering circuit which is supplied with the output of said receiver and is controlled by the output of said second comparator;
   wherein when an altitude difference between said subject aircraft and said other aircraft is equal to the altitude of said subject aircraft and said other aircraft is at an altitude lower than said subject aircraft, it is determined that said subject aircraft is staying on the ground, and the generation of an alarm is prevented on the basis of said response signal received from said other aircraft.

2. An alarm suppressing system for an aircraft collision avoidance system which has a function of determining whether or not a subject aircraft is in danger of colliding with other aircraft and which generates an alarm when it has determined that the subject aircraft is in danger of colliding with another aircraft, through utilization of a response signal received from said other aircraft, said alarm suppressing system comprising a gate circuit and said collision avoidance system comprising:
- a receiver for receiving at least said response signal from said other aircraft;
- a response detector for detecting said received response signal;
- a mode discriminator which receives the output of said response detector and discriminates the mode of reception of said response signal;
- an antenna switch switchable between low and high altitude side antennas;
- an antenna discriminator operatively associated with said antenna switch, for determining which of said antennas is in use;
- a computer which receives the output of said response detector via a gate circuit and determines whether or not said subject aircraft is in danger of midair collision with said other aircraft in accordance with said output of such response detector; and
- a display;

said alarm suppressing system comprising:
- an altitude detecting means for determining the altitude of the subject aircraft;
- an analog-to-digital converter for converting the altitude of said subject aircraft into a predetermined code;
- an altitude discriminator which receives the output of said analog-to-digital converter and determines the altitude of said subject aircraft;
- a logic circuit which is supplied with the outputs of said antenna discriminator, said mode discriminator and said altitude discriminator; and
- said gate circuit for controlling the output of said response detector by the output of said logic circuit;
- wherein when said response signal from said other aircraft is received by said low altitude side antenna, and when said received response signal is of Mode A and the altitude of said subject aircraft is lower than a predetermined value, said received response signal from said other aircraft is inhibited from being input to the aircraft collision avoidance equipment mounted on said subject aircraft, thereby preventing the generation of a useless alarm.

3. An alarm suppressing system for an aircraft collision avoidance system which has a function of determining whether or not a subject aircraft is in danger of colliding with other aircraft and which generates an alarm when it has determined that the subject aircraft is in dange of colliding with another aircraft, through utilization of a response signal received from said other aircraft, said alarm suppressing system comprising a filtering circuit and said collision avoidance system comprising:
- a receiver for receiving at least said response signal from said other aircraft;
- a response detector for detecting said received response signal;
- a computer which receives the output of said response detector via a filtering circuit and determines whether or not said subject aircraft is in danger of midair collision with said other aircraft in accordance with said output of said response detector; and
- a display;

said alarm suppressing system comprising:
- a radio altitude detecting means for determining the altitude of the subject aircraft;
- an atmospheric altitude detecting means mounted on said subject aircraft;
- an encoder for receiving outputs from said radio altitude detecting means and said atmospheric altitude detecting means and for providing predetermined codes in response to said outputs;
- a ground altitude calculating machine which receives the outputs of said encoder and said response detector, computes the atmospheric pressure on the ground, and compares said atmospheric pressure on the ground and altitude information derived from atmospheric pressure information contained in said response signal received from said other aircraft;
- a filtering circuit which receives an output from the response detector and which is controlled by said ground altitude calculating machine;
- wherein when said response signal received from said other aircraft is of mode C, ground atmospheric pressure information is computed on the basis of a signal available from said altitude detector of said subject aircraft, altitude information based on atmospheric pressure is extracted from said mode C response signal, said extracted altitude information and said atmospheric pressure information are compared by said ground altitude calculating machine, which determines whether said other aircraft having delivered said response signal is staying at an airport or is in flight, and said filtering circuit is controlled on the basis of the result of said determination so that said response signal from said other aircraft staying at said airport is prevented from being supplied to the aircraft collision avoidance equipment mounted on said subject aircraft, thereby preventing the generation of useless alarm.

4. An alarm suppressing system for an aircraft collision avoidance system which has a function of determining whether or not a subject aircraft is in danger of colliding with other aircraft and which generates an alarm when it has determined that the subject aircraft is in danger fo colliding with another aircraft, through utilization of a response signal received from said other aircraft, said alarm suppressing system comprising a filtering circuit and said collision avoidance system comprising:
- a receiver for receiving said response signal from said other aircraft;
- a response signal detector for directing said received response signal;
- a computer which receives an output of a filtering circuit of said alarm suppressing system and determines whether or not said subject aircraft is in danger of midair collision with said other aircraft; and
- a display;

said alarm suppressing system comprising:

a receiver for receiving from an airport control center information concerning the atmospheric pressure at an airport and in its vicinity from an airport control center;

an encoder for encoding the output of said receiver;

a ground altitude calculating machine whereby altitude information based on atmospheric pressure is extracted from said received response signal of said other aircraft and said altitude information and said atmospheric information received from said airport control center are compared;

said filtering circuit which is controlled by an output of said ground altitude calculating machine and controls an output of said response signal detector;

wherein when said received response signal of said other aircraft is of mode C, said atmospheric pressure information received from said airport control center and altitude information derived from atmospheric information contained in said mode C response signal are compared by said ground altitude calculating machine, which determines whether said other aircraft transmitting said response signal is staying at said airport or is in flight, and on the basis of the result of said determination, the output of said response signal detector is prevented from input into said computer, thereby preventing the generation of a useless alarm.

5. An alarm suppressing system for an aircraft collision avoidance sytem which has a function of determining whether or not a subject aircraft is in danger of colliding with other aircraft and which generates an alarm when it has determined that the subject aircraft is in danger of colliding with another aircraft, through utilization of a response signal received from said other aircraft, said collision avoidance system comprising:

a receiver for receiving at least said response signal from said other aircraft;

an "ON THE GROUND" signal detector for detecting an "ON THE GROUND" signal contained in said response signal;

said alarm suppressing system comprising:

a filtering circuit for permitting and inhibiting the input of said received response signal to the aircraft collision avoidance system in accordance with the output of said "ON THE GROUND" signal detector;

wherein said when "ON THE GROUND" signal is contained in said received response signal of said other aircraft, said received response signal is inhibited from being input to aircraft collision avoidance equipment mounted on said subject aircraft, thereby preventing a useless alarm from being raised.

* * * * *